Dec. 1, 1942.   L. K. MITCHELL   2,303,653
SPRING SUSPENSION FOR WHEELED VEHICLES
Filed June 17, 1941   2 Sheets-Sheet 1

Inventor
Louis K. Mitchell
By Arthur Minnick
Attorney

Dec. 1, 1942. L. K. MITCHELL 2,303,653
SPRING SUSPENSION FOR WHEELED VEHICLES
Filed June 17, 1941 2 Sheets-Sheet 2

Inventor
Louis K Mitchell
By Arthur Minnick
Attorney

Patented Dec. 1, 1942

2,303,653

UNITED STATES PATENT OFFICE 2,303,653

SPRING SUSPENSION FOR WHEELED VEHICLES

Louis K. Mitchell, Tampa, Fla.

Application June 17, 1941, Serial No. 398,458

5 Claims. (Cl. 267—11)

This invention relates to spring suspensions by means of which wheeled vehicles may be effectively cushioned against shocks of the road and against side sway.

A primary object of the invention is to provide a leverage by which the force of the shock on one end of an axle may be resisted simultaneously by springs at both sides of the vehicle.

A further object of the invention is to utilize the inertia of a vehicle at the pivoted center of a lever which will convert an upward thrust at one end into a downward thrust at the other, whereby the upward force of a shock on one side is directed toward the roadbed on the other side and is resisted primarily by the tires and by the springs on both sides and only secondarily by the body through a smaller range of movement.

A still further object is to provide resilient means for holding the body of the vehicle against tilting or side sway, such means cooperating with the leverage to apply additional tension upon the body on the side receiving an upward thrust, thereby, in effect, increasing the inertia of the body as against side sway in proportion to the shock.

An advantage of the central pivoting of the lever at the transverse center of either end of the body is that the inertia of half of the total mass is available to resist the thrust, and because of the resilient connection between each end of the lever and the adjacent end of the axle, the axle is in effect pivoted to the body centrally upon yielding supports which permit many movements to neutralize each other.

Figure 1:
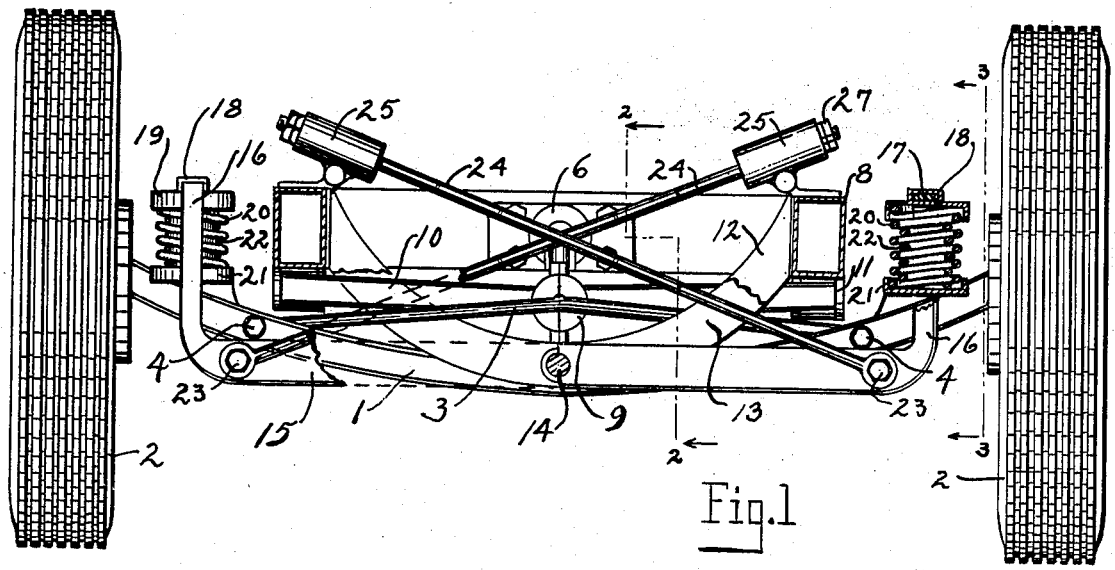
Figure 2:
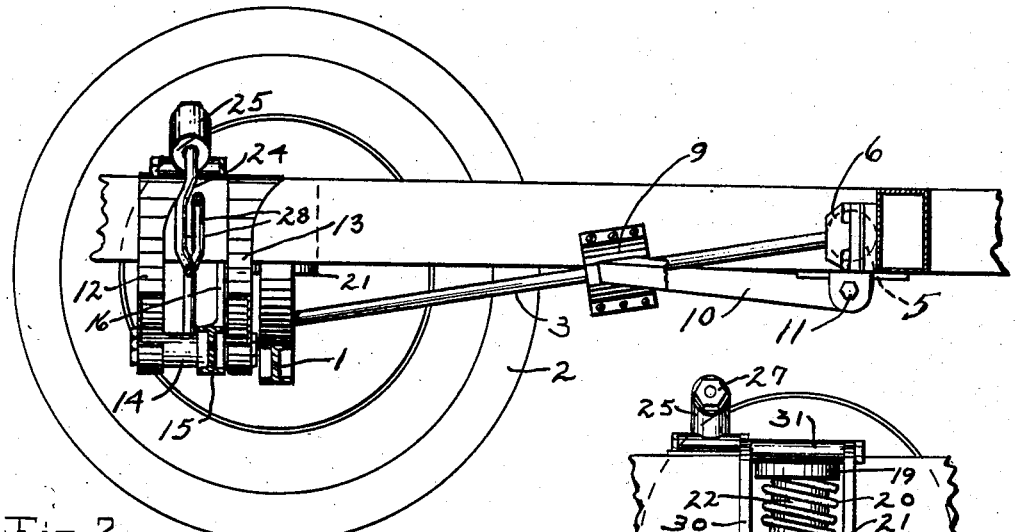
Figure 5:
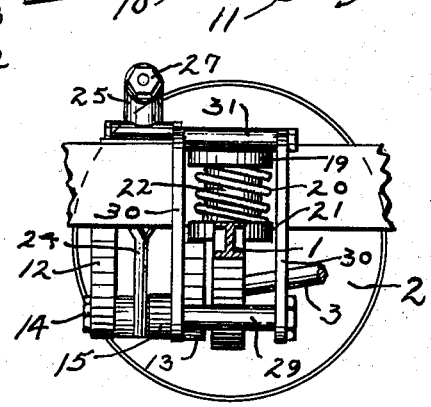
Figure 3:
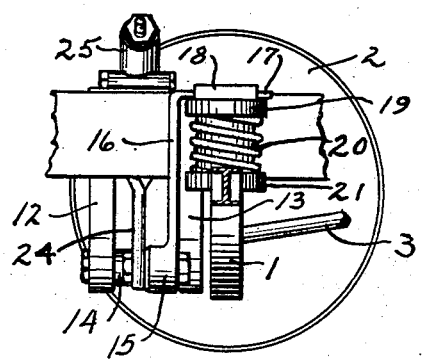
Figure 4:
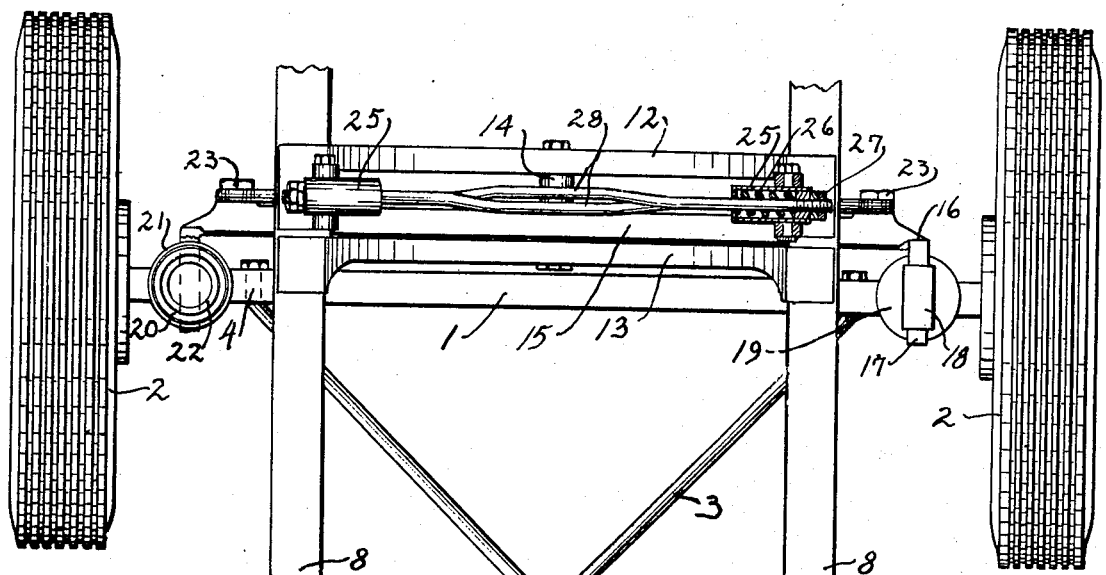
Figure 7:
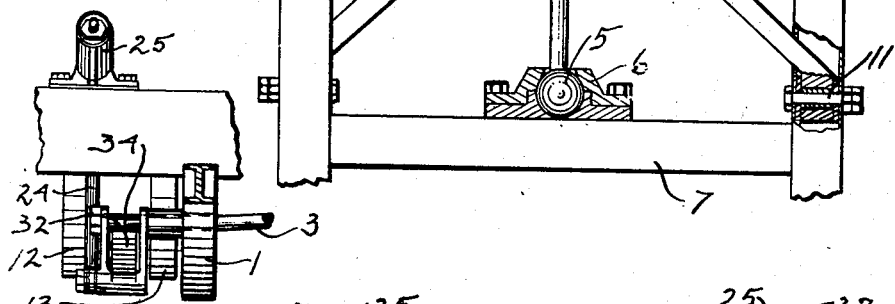
Figure 6:
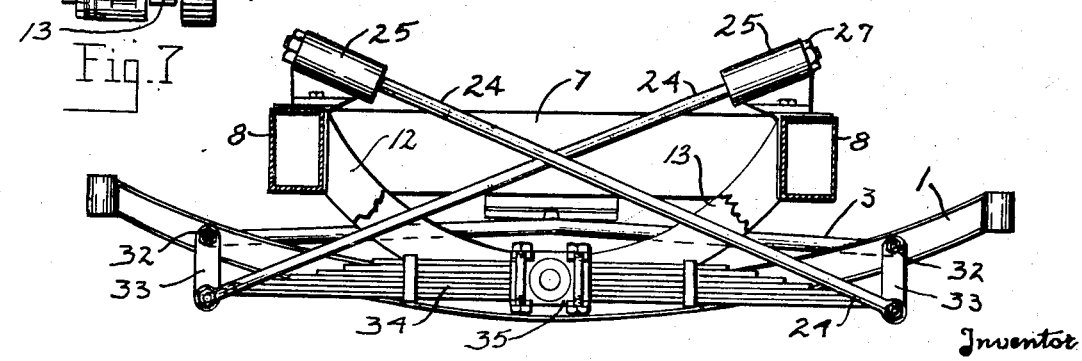

In the drawings illustrating certain preferred forms of the invention, Figure 1 is a front elevation of the forward end of a vehicle, parts being shown in section and parts being broken away; Fig. 2 is a vertical section on the line 2—2 of Fig. 1; Fig. 3 is a fragmentary view on the line 3—3 of Fig. 1; Fig. 4 is a plan view of the structure of Fig. 1; Fig. 5 is a fragmentary elevation showing a modification of the structure of Fig. 3; Fig. 6 is a front elevation of a modification using leaf springs as the lever; and Fig. 7 is a fragmentary side elevation of the structure of Fig. 6.

The front axle of a vehicle is indicated at 1 and its supporting wheels at 2. A radius rod 3, secured at 4, 4, on the axle and having a ball joint 5 pivoted in a bearing 6 on a transverse member 7 connecting the side members 8, 8, of the chassis, serves to hold the axle erect and against movement longitudinally of the chassis. The central portion of the rod 3 is pivotally mounted in a sleeve 9 carried at the forward end of arms 10, 10, which are pivotally mounted at their rear ends horizontally upon the chassis to permit vertical movement of the radius rod toward and from the body while preventing horizontal angular movement of the axle with respect to the chassis.

In front of the axle and suspended between the members 8, 8, of the chassis are brackets 12 and 13 forming supports for the pivot 14 of a lever 15. At each end, this lever is bent upward to form an arm 16 having a portion 17 extending sidewise above the axle 1. The portion 17 lies within a loop 18 on a cap 19 which rests upon the upper end of a coiled spring 20, the lower end of which is held in a cup 21 upon the axle. A second coiled spring 22 is shown in Figs. 1 and 4 within the spring 20, this second spring being shorter than the spring 20 to act only as a reinforcing spring for extra loads or excessive shocks.

By this arrangement, the lever 15 bears downward at each end upon a spring 20, and at its center pivot 14, the lever bears half of the weight of the chassis and of whatever load the chassis may carry. It will, of course be understood that this arrangement may be repeated or duplicated at the other end of the chassis, and this duplication has not been illustrated.

Near each end of the lever 15 is a pivot 23 from which a rod 24 extends upward and sidewise across the longitudinal center of the chassis to a cylindrical casing 25 upon a chassis member 8. Within this casing is a spring 26 to resist outward movement of the rod. Nuts 27 on the threaded end portion of the rods 24 provide for the adjustment of the spring tension to level the chassis. An increase in the spring tension will increase the resistance to movement of the lever 15. As shown in Figs. 2 and 4, the rods 24 are offset near their central portions at 28, to avoid interference with each other.

In Fig. 5, a modification is shown in which the lever 15 has a projecting stud 29 to which are pivoted shackles 30 which extend upward to a pivotal support 31 on the cap 19, these shackles, stud, and pivot replacing the arm 16 and its sidewise extension 17 of the previously described structure.

Another modification of the invention is illustrated in Figs. 6 and 7, in which the radius rod 3 has its forward ends formed as perches 32 to carry shackles 33 upon which are pivotally supported the ends of a leaf-spring assembly 34 which has its center held within a clamp 35 pivoted in the brackets 12 and 13. Tension rods 24 are pivoted at their lower ends in this construction upon the same pivots that support the ends of the spring assembly upon the lower ends of the shackles.

The operation of the device may perhaps best be understood by a study of Fig. 1. It will be seen that if the wheel 2 on either side is thrust upward, the axle 1 will be lifted carrying the cup 21 upward to compress the spring 20. The pressure of this spring on the cap 19 will cause the arm 16 to lift that end of the lever 15 and since the inertia of the load will hold the pivot 14 momentarily stationary, the lever will swing on its pivot, causing the other end of the lever to compress the spring 20, this being resisted by the axle and the wheel and the tire at that end.

Thus both of the springs 20 act simultaneously to cushion any upward shock on either wheel.

Sidewise movement of the body causing the chassis to rock will be resisted by the springs 26, the stabilizing rods 24, the centralizing lever 15, and the springs 20. There is a continuous tension acting to maintain the levelness of the body and cushioning any shock which would cause sidesway. A lifting movement of the axle at either end will cause a downward movement of the remote end of the lever, and this movement of the lever will cause a longitudinal pull upon the stabilizing rod 24 which will compress the spring 26 on the side where the axle is lifted. Since the tilting movement of the body with respect to the lever is resisted by the springs 26, any increase in the tension of these springs will cause greater resistance to a tilting movement of the body upon the lever or of the lever on the body. If the body bears a greater load, the springs 20 will evidently be more greatly compressed and this will also cause an increase in resistance to the pivotal movement of the lever. The effect of the increase in the tension of the spring 26 is substantially the same as is produced by an increase in the load, and this increase in tension is proportional to the upward thrust on the wheel.

While roadbuilders endeavor to construct smooth pavements, there are always irregularities in road surfaces. As a vehicle travels along a roadway, each wheel, independently of the others, has three possible phases of movement: it may be going upward, or going downward, or it may move neither up nor down.

When the two wheels at opposite ends of the same axle in the present structure are both on a level surface there is no vertical movement and hence no tilting of the lever. When one wheel goes up and the other simultaneously goes down and both then return simultaneously to the level, the reverse movement of the ends of the lever will evidently cause no vertical movement of the body and this will evidently be true no matter how often this tilting movement of the lever may be repeated or whether the tilting movement be fast or slow.

When one wheel remains level and the other goes up, the pivot of the lever will evidently lift only half as much as the end, and since the spring on the other end of the lever is compressed by the tilting of the lever, the upward thrust at the center is a small fraction of that at the lifting end of the lever. When one wheel remains level and the other goes down, the pivot will fall only half as much as the end of the lever, and with this release in pressure, the spring at the other end of the lever will expand resist the lowering of the pivot.

If both wheels lift simultaneously or drop simultaneously, there will evidently be no tilting movement of the lever, but even in these cases, the springs 20 will function to cushion the shocks as well as in most ordinary suspensions.

The structures illustrated are to be considered merely as typical examples of possible embodiments of this invention since many changes in details of construction will be necessary to adapt the device to different vehicles without departure from the essence of the invention as set forth in what is claimed.

I claim:

1. A vehicle suspension comprising an axle, a frame, having a transverse member, a lever pivoted upon the transverse member of the frame adjacent to the axle and substantially parallel therewith, a spring carried by the axle near each end thereof, means upon the lever at each end thereof engaging the adjacent spring upon the axle, two tension rods, each rod being pivoted at its outer end near the end of the lever and secured at its inner end to the frame, and each rod having a spring connected therewith to restrain movement of the lever relative to the frame.

2. In combination, an axle, a spring carried by the axle on each side of its longitudinal center, a frame having a transverse member, a lever pivoted centrally of the transverse member and supported at its ends upon the springs carried by the axle, each end of the lever having a rod pivoted thereto and extending therefrom across the longitudinal center of the transverse frame member, a securing means upon the frame for the end of each rod remote from the lever, a resilient element interposed between each rod and the securing member whereby the movement of each rod is resisted by the resilient element and whereby tilting movement of the frame upon the lever is restrained by the resilient elements.

3. A vehicle body support comprising an axle, a lever pivoted centrally upon the body and supported at its ends by the axle, and tension means extending from each side of the body downward across the central pivotal axis of the lever and engaging an outer end of the lever on the opposite side of the axis for restraining tilting movement of the body on the lever, one of the supporting means comprising a resilient element permitting vertical movement of the body upon the axle.

4. A vehicle suspension comprising an axle, a frame, a lever substantially parallel with the axle and pivoted centrally of its length at the transverse center of the frame, coil springs carried by the axles and supporting the outer ends of the lever, and means for preventing lateral and longitudinal movement of the axle with respect to the frame comprising a Y-shaped radius rod having its two forward ends secured rigidly to the axle upon opposite sides of its transverse center, a sleeve surrounding the rear arm of the radius rod, arms secured to the sleeve at their forward ends and pivoted horizontally upon opposite sides of the frame at their rear ends, and the rear end of the radius rod having a pivotal connection with the frame.

5. A vehicle body support comprising an axle, a spring carried by the axle near each end thereof, the body having a transverse frame member, a lever pivoted centrally upon the transverse member adjacent to the axle and having means at each end engaging the adjacent spring upon the axle to be supported thereby, and means for restraining tilting movement of the body comprising two tension members interposed between the body and the lever, each member being attached at one end to the lever near one outer end thereof and being attached at the other end to a portion of the body above and upon the opposite side of the point at which the lever is pivoted to the transverse member of the frame, and each tension member having a resilient element permitting limited relative movement of the body with respect to the lever.

LOUIS K. MITCHELL.